United States Patent
Rajagopalan et al.

(10) Patent No.: US 10,979,497 B2
(45) Date of Patent: Apr. 13, 2021

(54) MULTI-NODE DISCOVERY AND MASTER ELECTION PROCESS FOR CHASSIS MANAGEMENT

(71) Applicant: Cisco Technology, Inc., San Jose, CA (US)

(72) Inventors: Harikrishnan Rajagopalan, Bengaluru (IN); Kanika Kakkar, Bengaluru (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/453,019

(22) Filed: Jun. 26, 2019

(65) Prior Publication Data

US 2020/0028902 A1  Jan. 23, 2020

(30) Foreign Application Priority Data

Jul. 19, 2018 (IN) .............................. 201841026961

(51) Int. Cl.
  *G06F 15/173*  (2006.01)
  *H04L 29/08*  (2006.01)
  (Continued)

(52) U.S. Cl.
  CPC ........ *H04L 67/1051* (2013.01); *H04L 49/201* (2013.01); *H04L 49/30* (2013.01); *H04L 49/40* (2013.01); *H04L 49/65* (2013.01)

(58) Field of Classification Search
  CPC ............... G06F 13/364; G06F 11/3058; G06F 11/2289; G06F 11/3006; G06F 11/3027;
  (Continued)

(56) References Cited

U.S. PATENT DOCUMENTS

2012/0166390 A1* 6/2012 Merriman ........... G06F 11/1458
  707/613
2013/0103844 A1* 4/2013 Bulut ...................... H04W 4/60
  709/228
(Continued)

FOREIGN PATENT DOCUMENTS

EP  3240238 A1  1/2017

OTHER PUBLICATIONS

Hamilton, "Distributed Algorithms", http://www2.cs.uregina.ca/~hamilton/courses/330/notes/distributed/distributed.html, Reference: SGG7, 18.6-18.7, downloaded Jun. 26, 2019, 3 pages.

(Continued)

*Primary Examiner* — Brian Whipple
*Assistant Examiner* — Gregory P Tolchinsky
(74) *Attorney, Agent, or Firm* — Edell, Shapiro & Finnan, LLC

(57) ABSTRACT

In a chassis including a plurality of nodes, a network switch, and a programmable device configured to manage a shared resource of the chassis, a method includes establishing, using the network switch, a dedicated network among baseboard management controllers of respective nodes in the plurality of nodes; and using the dedicated network, automatically selecting a given node from the plurality of nodes to function as a master node to program the programmable device on behalf of all nodes in the plurality of nodes to manage the shared resource of the chassis on behalf of all the nodes in the plurality of nodes.

18 Claims, 7 Drawing Sheets

(51) Int. Cl.
*H04L 12/931* (2013.01)
*H04L 12/935* (2013.01)

(58) Field of Classification Search
CPC ..... H04L 67/1051; H04L 49/40; H04L 49/65; H04L 49/201; H04L 49/30
See application file for complete search history.

(56) References Cited

U.S. PATENT DOCUMENTS

| | | | | |
|---|---|---|---|---|
| 2013/0278412 A1* | 10/2013 | Kelly | .................. | G08B 26/00 340/539.1 |
| 2014/0229758 A1* | 8/2014 | Richardson | ......... | G06F 11/3006 714/4.11 |
| 2016/0099886 A1 | 4/2016 | Rao et al. | | |
| 2016/0117213 A1* | 4/2016 | Arjun | ................. | G06F 11/0757 714/55 |
| 2016/0182484 A1* | 6/2016 | Shih | .................... | H04L 63/083 726/6 |
| 2017/0102952 A1* | 4/2017 | Khemani | ............ | G06F 13/4282 |
| 2017/0139797 A1* | 5/2017 | Wang | ................. | G06F 11/3027 |
| 2017/0206110 A1* | 7/2017 | Huang | ................ | G06F 9/45558 |
| 2018/0039552 A1* | 2/2018 | Moskowiz | ............ | G06F 11/203 |
| 2018/0157509 A1* | 6/2018 | Suryanarayana | ... | G06F 9/45558 |
| 2018/0278468 A1* | 9/2018 | Rao | .................... | H04L 41/0663 |
| 2018/0302861 A1* | 10/2018 | Zhao | ....................... | H04L 29/08 |
| 2018/0335958 A1* | 11/2018 | Wu | ....................... | G06F 3/0613 |
| 2019/0171602 A1* | 6/2019 | Olarig | ................. | G06F 13/1668 |

OTHER PUBLICATIONS http://e-reading.club/, "3.3.2. A Ring Algorithm e-reading.club", https://www.e-reading.club/chapter.php/143358/99/Tanenbaum_-_Distributed_operating_systems.html, downloaded Jun. 26, 2019, 1 page.

A.Arghavani et al., "Improved Bully Election Algorithm in Distributed Systems", Proceedings of the 5th International Conference on IT & Multimedia at UNITEN (ICIMU 2011) Malaysia, Nov. 14-16, 2011, 6 pages.

Wikipedia, "Bully algorithm", https://en.wikipedia.org/wiki/Bully_algorithm, Aug. 15, 2018, 3 pages.

Quazi Ehsanul Kabir Mamun et al., "Modified Bully Algorithm for Electing Coordinator in Distributed Systems"CD Proceedings of the 3rd WSEAS International Conference on Software Engineering, Parallel and Distributed Systems (SEPADS) 2004, Feb. 13-15, 2004, 6 pages.

International Search Report and Written Opinion in counterpart International Application No. PCT/US2019/041294, dated Oct. 14, 2019, 12 pages.

* cited by examiner

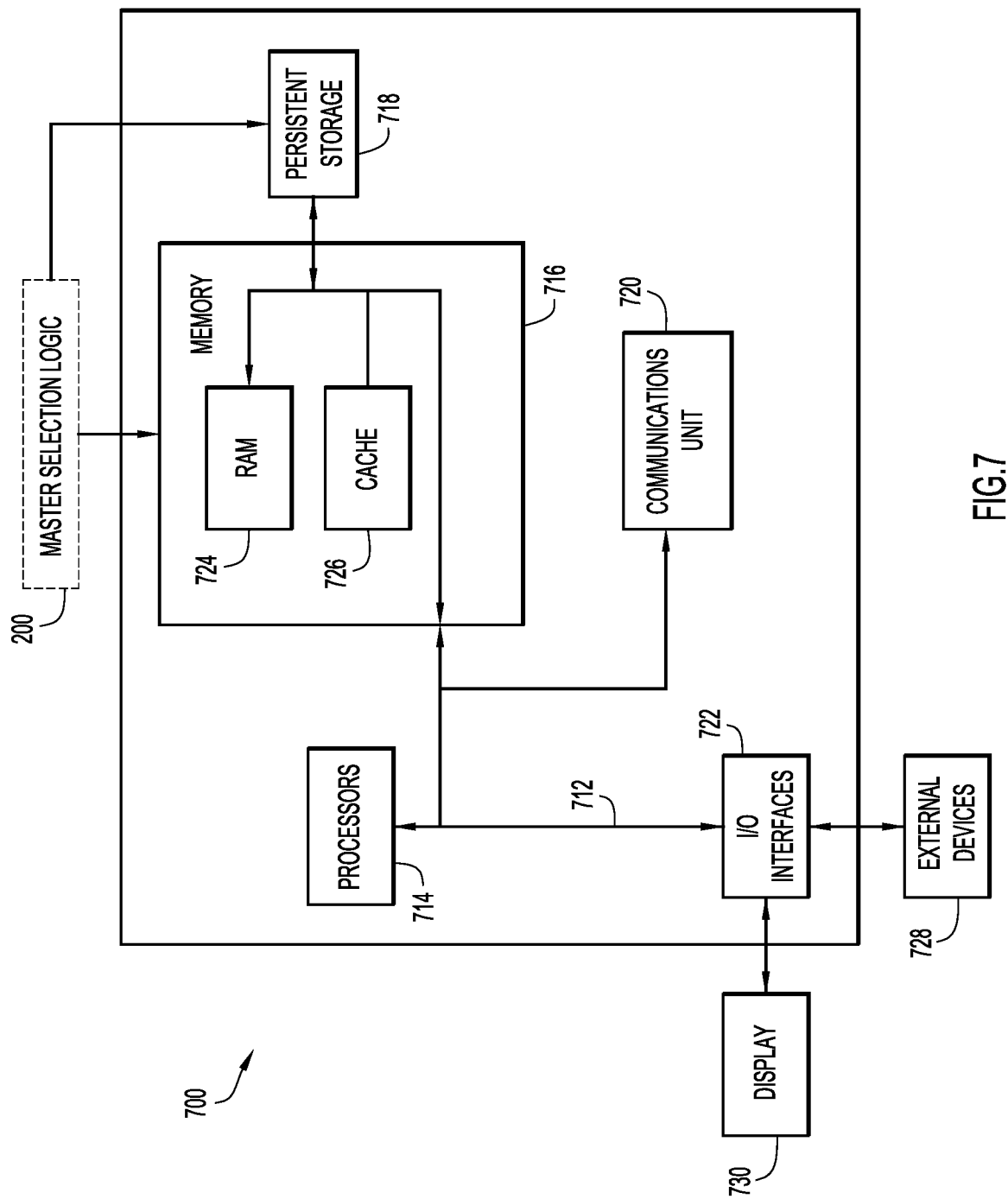

MULTI-NODE DISCOVERY AND MASTER ELECTION PROCESS FOR CHASSIS MANAGEMENT

PRIORITY CLAIM

This application claims priority to Indian Provisional Patent Application No. 201841026961, filed Jul. 19, 2018, the subject matter of which is incorporated herein by reference.

TECHNICAL FIELD

The present disclosure relates to shared hardware resources management.

BACKGROUND

As industry moves to a hybrid-cloud infrastructure model of a data-center architecture, there is increasing demand for high performance fault-tolerant compute systems forming a low-latency on-premises cloud that allows linear scaling of infrastructure. Among such systems, one popular implementation is a cluster having four nodes, e.g., blade servers, in one 2U rack chassis. Such an implementation allows three nodes to form a minimal cluster with one node operating as an active standby to take the load in case of any other single node failure. Each cluster includes a well-balanced amount of storage, compute and network hardware, and operates as a single unit over a high-speed local bus interconnect, such as Peripheral Component Interconnect Express (PCIe), to achieve maximum performance out of a given hardware configuration. Such a configuration may be referred to as a "hyper-converged infrastructure." Each node in the cluster also includes a baseboard management controller (BMC), which manages its respective motherboard. Unlike traditional server chassis systems, in a hyper-converged infrastructure there are no separate input/output (IO) hardware plugin modules that perform IO aggregation and that send data out of the chassis to storage enclosures connected through external top of the rack switches. This architectural shift makes chassis management "lighter" compared to traditional architectures by enabling chassis-level resource sharing including, e.g., cooling-fans and power supply units (PSUs), among other shared resources. In conventional approaches, a separate Chassis Management Controller (CMC) and its identical active standby twin are used to manage such shared resources.

BRIEF DESCRIPTION OF THE DRAWINGS

FIG. 7 depicts a device (e.g., a BMC, node) that might host and execute master selection logic in accordance with an example embodiment.

DESCRIPTION OF EXAMPLE EMBODIMENTS

Overview

In one embodiment, a method is provided. In a chassis comprising a plurality of nodes, a network switch, and a programmable device configured to manage a shared resource of the chassis, the method includes establishing, using the network switch, a dedicated network among baseboard management controllers of respective nodes in the plurality of nodes; and using the dedicated network, automatically selecting a given node from the plurality of nodes to function as a master node to program the programmable device on behalf of all nodes in the plurality of nodes to manage the shared resource of the chassis on behalf of all the nodes in the plurality of nodes.

In another embodiment, an apparatus is provided and includes: a chassis; a network switch; a programmable device configured to manage a shared resource of the chassis; and a plurality of nodes disposed in the chassis, wherein each node in the plurality of nodes comprises a baseboard management controller and a network interface to communicate with the network switch, wherein the plurality of nodes and the network switch define a dedicated network, wherein respective baseboard management controllers of each of the nodes in the plurality of nodes are configured to automatically select a given node from the plurality of nodes to function as a master node to program the programmable device on behalf of all nodes in the plurality of nodes to manage the shared resource of the chassis on behalf of all the nodes in the plurality of nodes.

EXAMPLE EMBODIMENTS

Presented herein are approaches and methodologies to achieve shared hardware resources management without having to rely on separate Chassis Management Controller (CMC) hardware or software, by having the BMCs of respective nodes in a cluster of nodes on a chassis actively communicate with one another to intelligently select one among them as a master node that controls and monitors the shared chassis resources. More specifically, the disclosed embodiments define a unique way of discovering dynamic node insertion onto the chassis, a methodology to contest mastership among peer BMCs (or nodes), and a unique way of requesting and handing over mastership to a requesting peer BMC (or node), without losing chassis management context. In an embodiment, fault tolerance is built into each stage of these approaches to ensure that catastrophic failures are eliminated even in the case of hardware malfunctions. A user may be notified of errors as they might occur.

Figure 1:
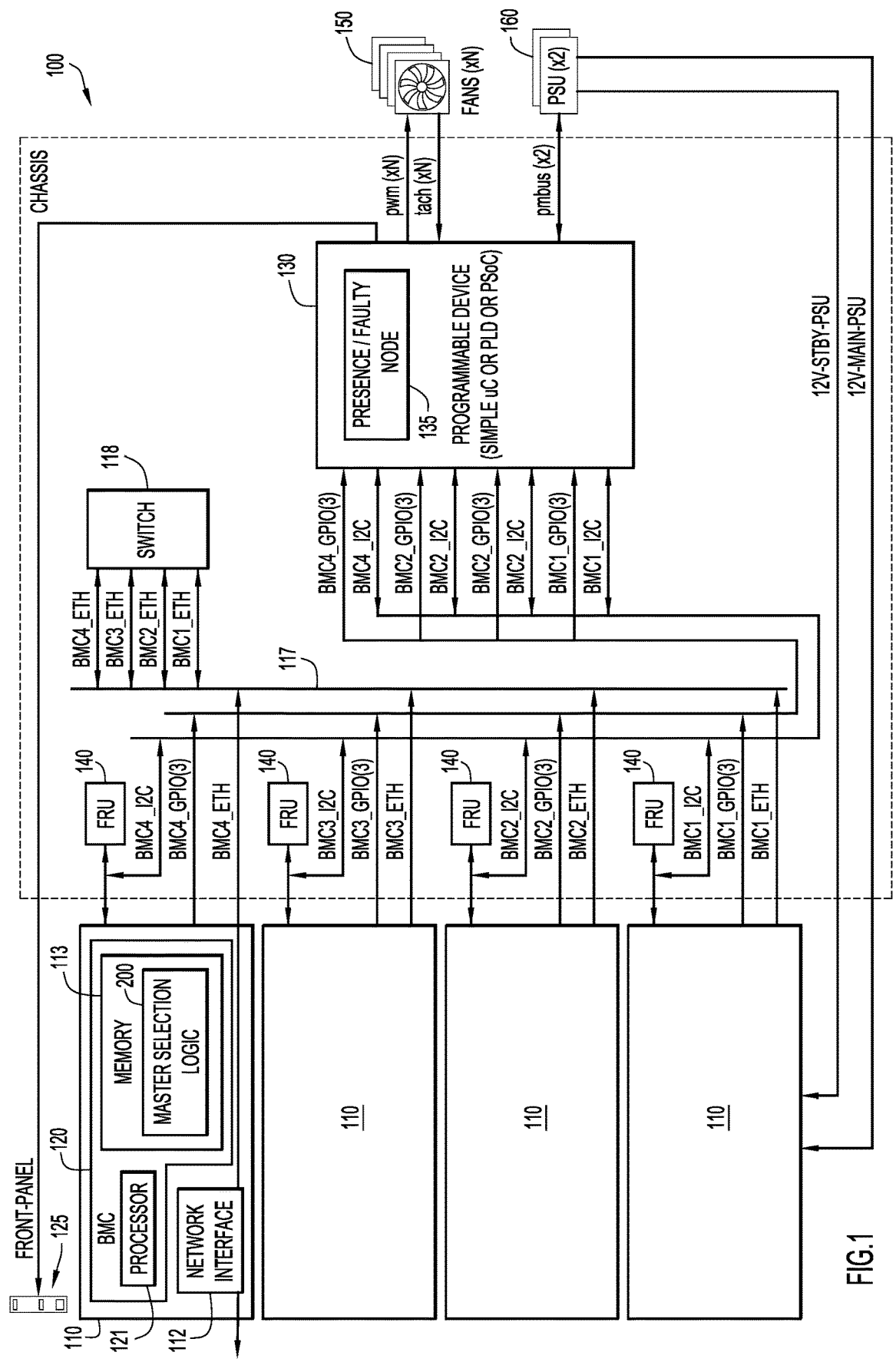
FIG. 1 is a schematic diagram of a multi-node chassis, according to an example embodiment.

Reference is first made to FIG. 1, which is a schematic diagram of a multi-node chassis (or, simply, "chassis") 100 according to an example embodiment. Chassis 100 includes receptacles (not shown) to accommodate, in the example shown, four (computer, blade server, etc.) nodes 110. Each node 110 includes, among other things, a network interface 112 and a BMC 120. The BMC 120 includes a processor 121, and memory 113, which stores master selection logic 200, which can be executed by processor 121. Details of master selection logic 200 are described more fully below. Network interface 112 is configured to support multiple interfaces including, e.g., two Ethernet interfaces. A first Ethernet network interface is to a network 117 that is used for dedicated communication among nodes 110 through a multi-port switch 118 built onto the chassis 100. Network 117 may also be referred to as a "dedicated network." In the example of FIG. 1, network 117 comprises BMC1_ETH, BMC2_ETH, BMC3_ETH and BMC4_ETH, and is used to exchange management data between the nodes 110. A second Ethernet network interface is employed to manage the BMCs, through remote interfaces, via, e.g., an enterprise local area network.

Network interface 112 may also support an Inter-Integrated Circuit (I2C) bus BMC1_i2C, BMC2_i2C, BMC3_i2C, BMC4_i2C (including a field replaceable unit (FRU) 140), and a general purpose input/output interface BMC1_GPIO(3), BMC2_GPIO(3), BMC3_GPIO(3), BMC4_GPIO(3) ("GPIOs"). The I2C bus and general purpose input/output interface may be considered to be communication paths different from network 117.

A programmable device 130 (such as a microprocessor, programmable logic device (PLD) or programmable system on a chip (PSoC)) is provided to control shared resources such as, e.g., fans 150, power supply units (PSUs) 160, which provide, e.g., 12V main and standby power, light emitting diodes (LEDs) on a front panel 125, and temperature sensors (not shown). Programmable device 130 itself is programmed, or updated, by one of the BMCs 120 associated with a node 110 that becomes a designated "master" node. Programming the programmable device 130 may include (re)installing firmware, configuring registers, and/or changing settings, among other possible programming operations. Programming or updating of the programmable device 130 may be performed, e.g., via the I2C bus (or possibly via the general purpose IO interface on the programmable device 130). In one implementation, the GPIOs are used to detect node presence. Upon insertion of a node into the chassis 100, an associated GPIO pin will become grounded or pulled to a high voltage. That ground or high voltage signal is provided, via the GPIOs, to programmable device 130, which may also include memory to store presence and/or faulty node information 135. In turn, such presence and/or faulty node information 135 may be provided to each of the BMCs over the I2C bus. This implementation provides a fault tolerant secondary method used to detect internal network failure due to hardware malfunction, such as a bent pin, broken socket, etc. while inserting/ejecting a node.

In an embodiment, the master selection logic 200 of a designated master node monitors and controls shared resources by aggregating data from all nodes 110 on the chassis 100. The methodologies described below define how to discover multiple nodes 110 in the chassis 100, and how to elect the master node, among nodes 110. Also described below is a mastership transfer procedure that can handle error scenarios such as inadvertent presence of multiple master nodes in the cluster.

In an embodiment, data transfer over network 117, is carried out using two types of data packets: a node data packet (sent by a slave node, i.e., not a master node) and a master data packet (sent by a master node).

A master data packet includes chassis telemetry information such as presence of fans 150, fan speed, presence of PSU 160, and voltage information, and protocol version among other possible parameters. The master data packet is broadcasted only by a master node to all slave nodes. The node data packet includes node information employed by the designated master node to control chassis components. The node information might include temperature, desired fan speed, slot ID, a protocol version, among other possible parameters. The node information is broadcasted in node data packets by all nodes 110 to their peers. This node information may be stored in each node in, e.g., memory 113. Master selection logic (or, simply, "logic") 200 is configured to send and receive the master data packets and the node data packets, as explained below.

Multi-Node Discovery

Figure 2:
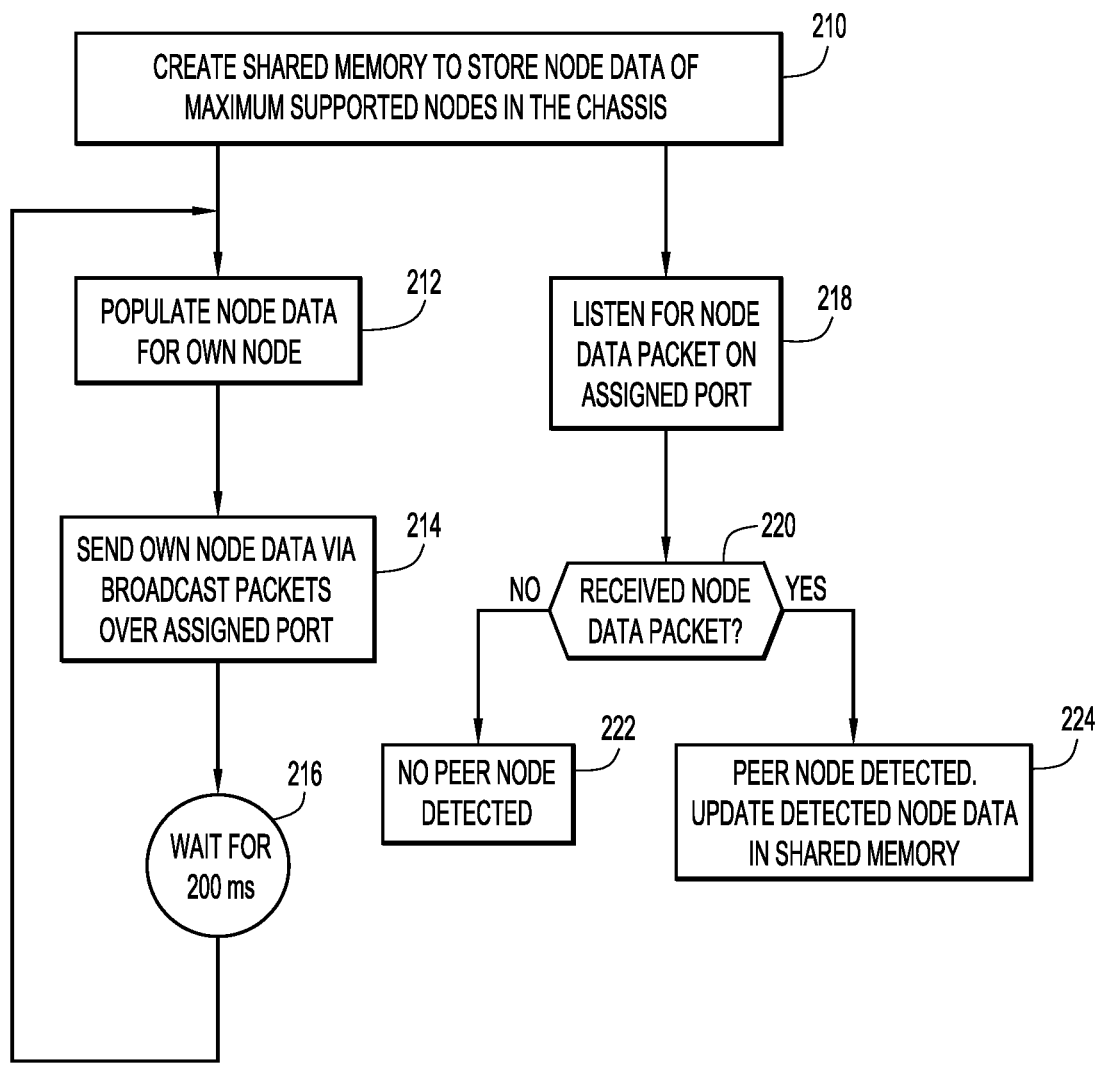
FIG. 2 is a flow chart depicting a series of operations for multi-node discovery, according to an example embodiment.

FIG. 2 is a flow chart depicting a series of operations for multi-node discovery. At a high level, the operations shown in FIG. 2 enable each node's data to be populated in its own shared memory, e.g., memory 113. Then, this data is broadcasted by each node to peer nodes every, e.g., 200 ms. At the same time, each node also listens for peer node data over an assigned port. Receipt of node data packets from peer nodes is also used as a primary means of detecting node presence. Information gleaned via the GPIOs, as noted above, is a secondary means of detecting node presence.

More specifically, at operation 210, logic 200, operating independently on each node 110, creates a shared memory location to store, in respective memory segments, node data for each of a maximum number of supported nodes 110 in the chassis 100. At 212, logic 200 populates its own node data in the shared memory location. At 214, logic 200 sends its own node data via broadcast node data packets over assigned ports. At 216, after a delay of, e.g., 200 ms, the logic 200 again populates node data for itself. In this manner, each node 110 gathers its own node data periodically and transmits that data over network 117 every, e.g., 200 ms. At the same time, at 218, the logic 200 listens for node data packets on the assigned port. At 220, it is determined whether any node data packets have been received. If not, at 222, it is determined that no peer node is detected. On the other hand, if node data packets have been received, then, at 224, it is determined that a peer node has been detected, and data received in such node data packets is updated in the shared memory, thereby enabling logic 200 on each BMC 120 to store all data associated with each node 110 in network 117, namely, the cluster that comprises the four nodes 110 shown in FIG. 1.

Master Election

Figure 3:
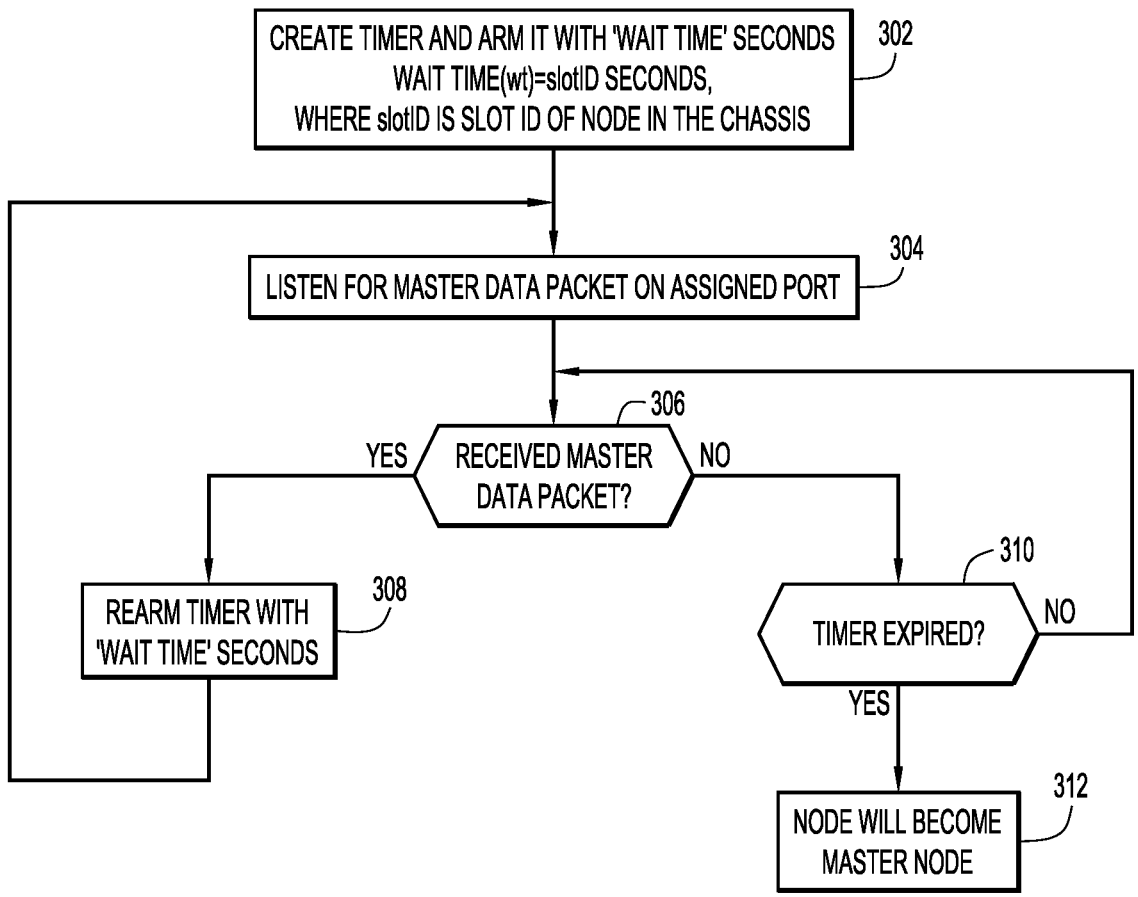
FIG. 3 is a flow chart depicting a series of operations for electing a master node, according to an example embodiment.

Reference is now made to FIG. 3, which is a flow chart depicting a series of operations for electing or designating one of the nodes 110 in the cluster to be a master node.

In general, when a node 110 boots up, it is configured, by default, to go into slave mode. In slave mode, the node 110 waits for a master data packet sent from a master node for a variable wait time (wt) defined by following formula:

Wait time (wt)=(SlotID)×seconds.

Once the wait time elapses, if a master data packet is not received, logic 200 is configured to cause a slave node to acquire mastership. A different wait time for each node 110 ensures that no two nodes 110 acquire mastership at the same time. If a new node 110 joins an existing cluster, the new node will capture a master data packet and will continue in slave mode. If the master node is rebooted/removed, existing slave nodes will restart the master election process.

More specifically, and as shown in FIG. 3, at 302, logic 200 creates a timer and arms the timer with "wait time" seconds according to a formula such as noted above, where SlotID is a slot ID of a slot in which a given node 110 is mounted in the chassis 100. At 304, logic 200 listens for a master packet on network 117 on an assigned port. At 306, logic 200 determines whether a master data packet has been received. If yes, this suggests that one node 110 in the cluster is already acting as the master node and, as such, at 308, logic 200 rearms the timer with "wait time" seconds, and the process returns to 304 to listen again for a master data packet. If, on the other hand, at 306, no master data packet was received, then at 310, it is determined whether the timer has expired, after a predetermined amount of time, e.g., 2 seconds. If the time has expired, then, at 312, logic 200 designates the node as the master node.

Fault Tolerance Mechanism

Figure 4:
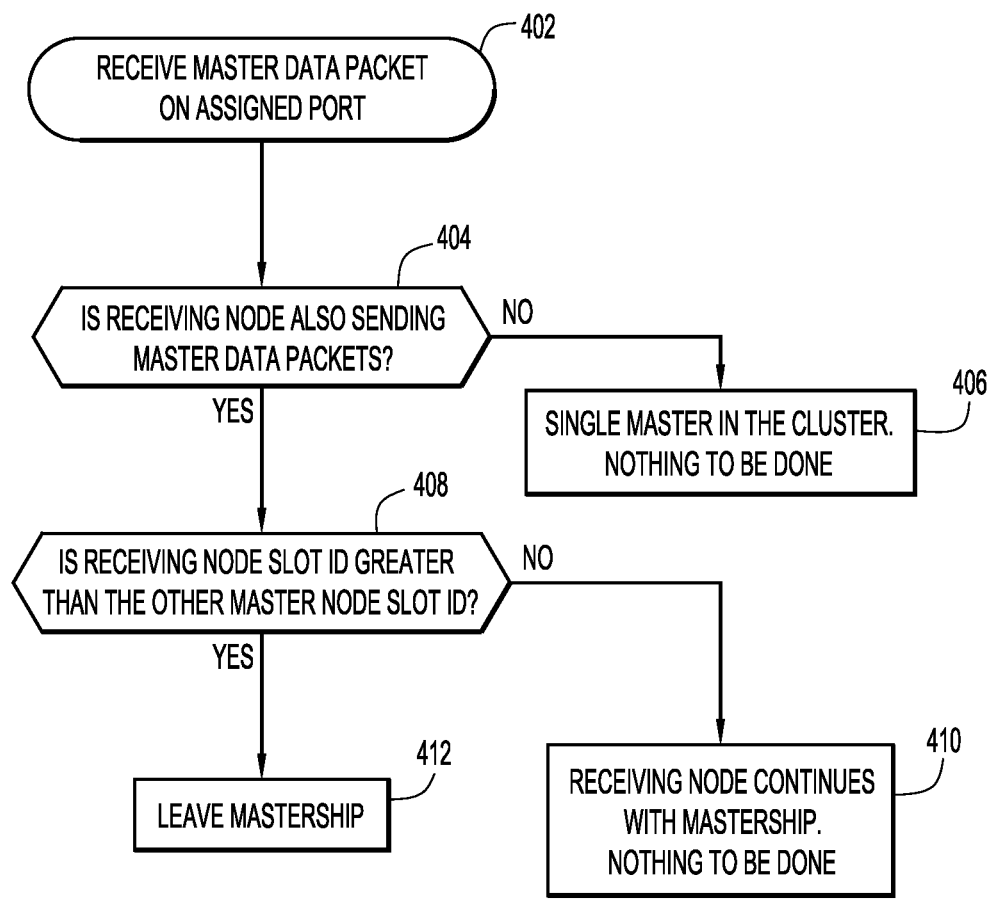
FIG. 4 is a flow chart depicting a series of operations for a fault tolerance process, according to an example embodiment.

Reference is now made to FIG. 4, which is a flow chart depicting a series of operations for a fault tolerance process. Under selected inadvertent conditions, network connectivity may be flawed, causing a given node 110 to disconnect from the switch 118 connecting the cluster nodes 110 together. For example, such conditions might include a bent pin on a connector, or a cable malfunction. A node 110 that fails to receive its own or a peer node's advertised node data packets is marked faulty, which withdraws that node from the master node election process. Programmable device 130 may keep track of which nodes are present and/or faulty, as mentioned previously. In an embodiment, an existing master node that is subsequently designated as faulty should leave mastership, and such an event invokes mastership arbitration logic among remaining healthy nodes.

In a scenario where no nodes 110 are able to communicate with each other, all the nodes 110 are marked faulty (in, e.g., programmable device 130) and none of them can participate in the master election process of FIG. 3. A brute force algorithm may then be initiated that identifies the node with a lowest slot ID present in the cluster and forces that node to be the master node. This is done to ensure that a master node is present in the cluster which can supervise chassis functionality, and manage the shared resources.

In a rare scenario in which multiple masters become present in the cluster simultaneously, the process of FIG. 4 may be invoked resolve the situation gracefully. That is, if a node which is sending master data packets also receives master data packets from another node, the process of FIG. 4 may be triggered. In such a situation, logic 200 is configured to cause the node 110 with the lowest slot ID to continue with mastership and to cause other nodes to leave mastership.

More specifically, at 402, one of the nodes 110, a "receiving node" for purposes of this functionality, receives a master data packet on an assigned port. At 404, logic 200 determines if the receiving node is also sending master data packets. That is, logic 200 is configured to detect whether there is more than one designated master node operating in the cluster. If, at 404, it is determined that the receiving node is not also sending master data packets, then logic 200 determines, at 406, that there is only a single master node in the cluster, and no further action is needed. If, on the other hand, at 404, it is determined that the receiving node is also sending master data packets then, at 408, logic 200 determines whether a slot ID of the receiving node is greater than a slot ID of the other node asserting mastership (by virtue of sending master data packets). If not, then at 410, the receiving node continues with being the designated master and nothing further needs to be done. On the other hand, if the slot ID of the receiving node is greater than the slot ID of the other node asserting mastership, then logic 200, at 412, is configured to cause the receiving node to leave mastership. That is, logic 200 causes the receiving node to no longer function as a master node.

Mastership Transfer

Once a cluster is up and running with an active master node, there may be situations in which a given slave node requests mastership. Such a situation may come about, for example, when the given node slave node receives a firmware update. The BMC 120 of such a slave node will want to become the master node in order to program the programmable device 130. Described below is a methodology to achieve non-disruptive transfer of mastership.

A given slave node may make a request for mastership by updating a corresponding flag in its node data packet. The designated master node, on receiving this request, decides whether mastership can be granted or not. The master node may take into consideration in making such a decision a state of critical operations which may need continued mastership.

If mastership can be granted to the requesting slave node, the master node so notifies the slave node. The slave node, on receiving a mastership grant, sends an acknowledgment confirming it is ready to take mastership. This three-way-handshake helps to ensure that mastership is transferred gracefully. On receiving an acknowledgment from the requesting node, the master node leaves mastership and the requesting slave node becomes master.

Figure 5:
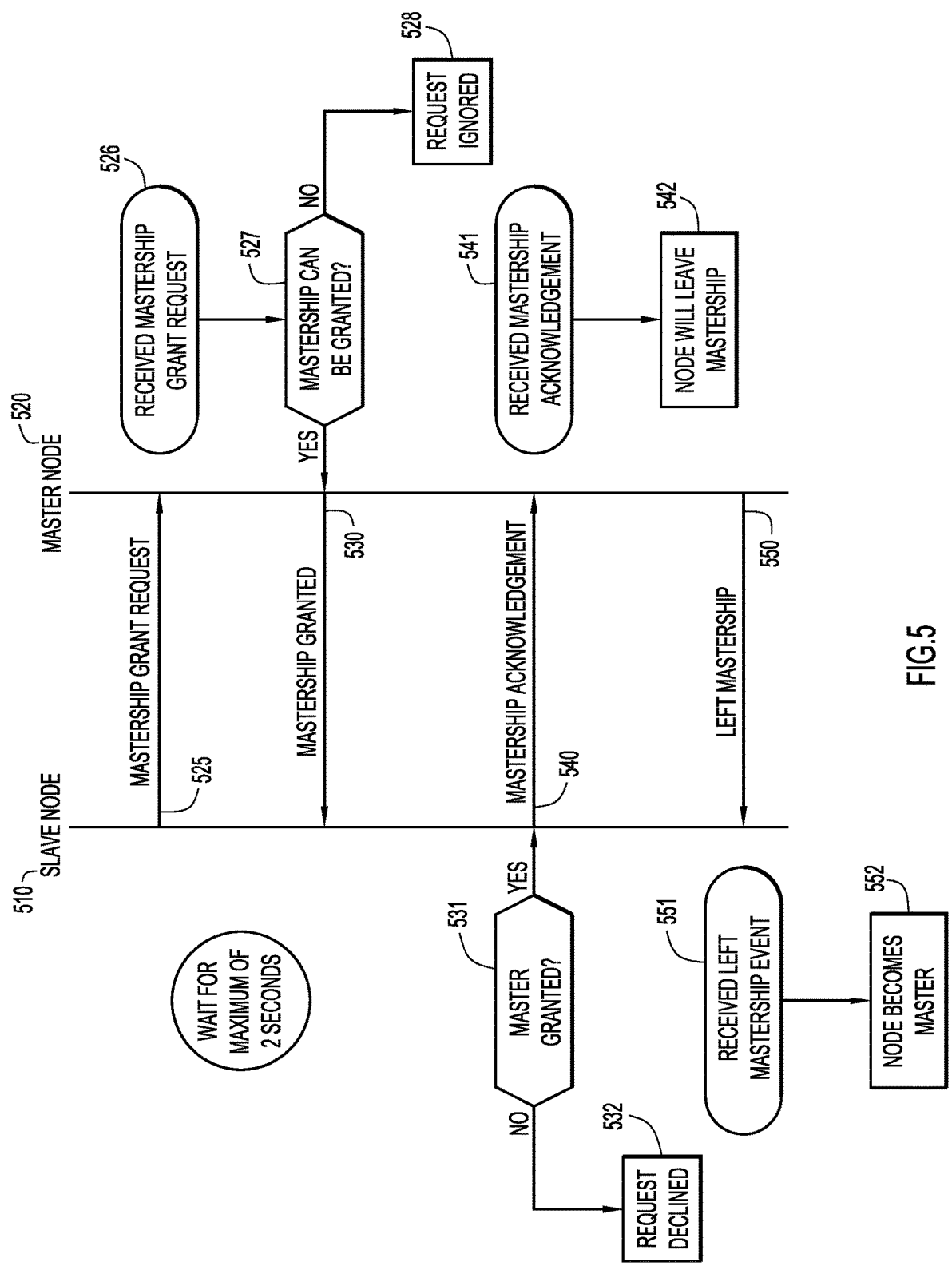
FIG. 5 is a flow chart depicting a series of operations for a mastership transfer process, according to an example embodiment.

Reference is now made to FIG. 5, which illustrates a series of operations for a mastership transfer process. As shown, a slave node 510 communicates with a master node 520. More specifically at 525, slave node 510 sends a mastership grant request to master node 520. Those skilled in the art will appreciate that logic 200 is configured to execute the above-described and following operations. At 526, master node 520 receives the mastership grant request and, at 527, determines whether mastership can be granted. If not, then, at 528, master node 520 ignores the mastership grant request. If mastership can be granted, then master node 520 sends a mastership granted message 530 to slave node 510. If, at 531, mastership cannot be granted due, e.g., to a timeout of, e.g., two seconds, then the mastership grant request may be considered declined at 532. If mastership is granted, then slave node 510 sends a mastership acknowledgment 540 to master node 520. At 541, master node 520 receives the mastership acknowledgment 540, and master node 520, at 542, then configures itself to leave mastership. In connection with leaving mastership, master node 520 sends a left mastership message 550 to slave node 510. Slave node 510 receives the left mastership message at 551, and, at 552, thereafter becomes the master node for the cluster.

Figure 6:
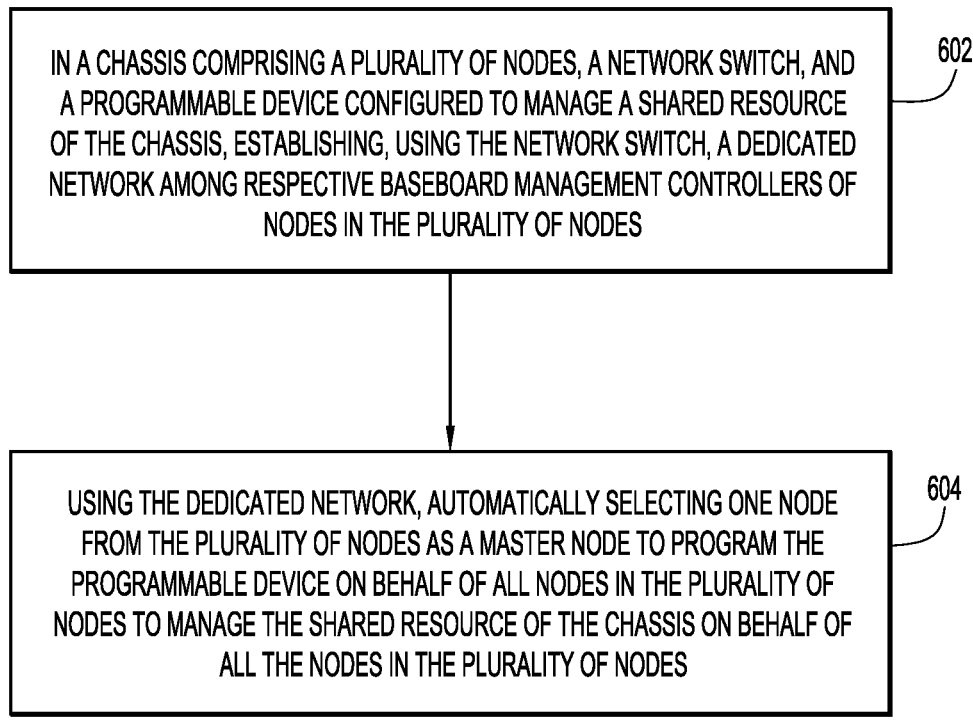
FIG. 6 is a flow chart depicting a series of operations for operating a cluster of nodes, according to an example embodiment.

FIG. 6 is a flow chart depicting a series of operations for operating a cluster of nodes, according to an example embodiment. At 602, in a chassis comprising a plurality of nodes, a network switch, and a programmable device configured to manage a shared resource of the chassis, the plurality of nodes establish, using the network switch, a dedicated network among respective baseboard management controllers of nodes in the plurality of nodes. At 604, using the dedicated network, the baseboard management controllers automatically select one node from the plurality of nodes as a master node to program the programmable device on behalf of all nodes in the plurality of nodes to manage the shared resource of the chassis on behalf of all the nodes in the plurality of nodes.

Those skilled in the art will appreciate that the data exchanges described in connection with FIGS. 2-6 may be carried out via, e.g., network 117.

In summary, a system and method are provided for a fault-tolerant and efficient way of discovering multiple nodes and electing a master among them. The disclosed methodology features a method of handling dynamic node insertion and removal without prior user input about the event. The methodology is configured to handle network failures gracefully by reconfiguring a cluster to ensure a master is chosen among connected nodes and only one master exists at any point in time.

FIG. 7 depicts a device 700 (e.g., a node 110) that master selection logic 200) in accordance with an example embodiment. It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media.

One or more programs (e.g., master selection logic 200) may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions that, when executed by the one or more processors 714, cause the computing device 700 to perform the operations of, e.g., FIGS. 2-6.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes in a chassis comprising a plurality of nodes, a network switch, and a programmable device configured to manage a shared resource of the chassis, establishing, using the network switch, a dedicated network among respective baseboard management controllers of nodes in the plurality of nodes; and using the dedicated network, automatically selecting a given node from the plurality of nodes to function as a master node to program the programmable device on behalf of all nodes in the plurality of nodes to manage the shared resource of the chassis on behalf of all the nodes in the plurality of nodes.

The method may further include the respective baseboard management controllers communicating with an enterprise local area network over a network, different from the dedicated network, to manage the respective baseboard management controllers.

In an embodiment, the shared resource include at least one of a fan for the chassis, a power supply unit for the chassis, light emitting diodes (LEDs) on a front panel of the chassis, and a temperature sensor for the chassis.

The method may still further include providing a communication path, different from the dedicated network, between each node of the plurality of nodes and the programmable device that is used to program the programmable device.

The communication path may be one of an Inter-Integrated Circuit (I2C) bus or general purpose input output line.

In an embodiment, the respective baseboard management controllers are configured to periodically receive node data from each of the nodes in the plurality of nodes via the dedicated network, and to store the node data.

The method may also include causing the given node to function as the master node after listening for, but not receiving after a predetermined amount of time, a master data packet from any other nodes in the plurality of nodes.

In an embodiment, the predetermined amount of time is determined based on a physical slot on the chassis in which the given node is mounted.

The method also include causing the given node to no longer function as the master node when the given node receives a master data packet from another node in the plurality of nodes.

The method may still further include receiving from another node in the plurality of nodes a master grant request which causes the given node to no longer function as the master node.

In another form, a device or apparatus may also be provided in accordance with an embodiment. The device may include a chassis; a network switch; a programmable device configured to manage a shared resource of the chassis; and a plurality of nodes disposed in the chassis, wherein each node in the plurality of nodes comprises a baseboard management controller and a network interface to communicate with the network switch, wherein the plurality of nodes and the network switch define a dedicated network, wherein respective baseboard management controllers of each of the nodes in the plurality of nodes are configured to automatically select a given node from the plurality of nodes to function as a master node to program the programmable device on behalf of all nodes in the plurality of nodes to manage the shared resource of the chassis on behalf of all the nodes in the plurality of nodes.

In an embodiment each respective baseboard management controller includes another network interface to an enterprise local area network, different from the dedicated network, to manage each respective baseboard management controller.

In an embodiment, the shared resource includes at least one of a fan for the chassis, a power supply unit for the chassis, light emitting diodes (LEDs) on a front panel of the chassis, and a temperature sensor for the chassis.

The device may further include a communication path, different from the dedicated network, between each node of the plurality of nodes and the programmable device that is used to program the programmable device.

In an embodiment, the communication path may be one of an Inter-Integrated Circuit (I2C) bus or a general purpose input output line.

In an embodiment, the baseboard management controller is configured to periodically receive node data from each of the nodes in the plurality of nodes via the dedicated network, and to store the node data.

In an embodiment, the baseboard management controller of the given node in the plurality of nodes is configured to cause the given node to function as the master node after listening for, but not receiving for a predetermined amount of time, a master data packet from any other nodes in the plurality of nodes.

In still another form, a non-transitory computer readable storage media is provided that is encoded with instructions that, when executed by a processor, cause the processor to establish, using a network switch, a dedicated network among respective baseboard management controllers of nodes in a plurality of nodes; and using the dedicated network, automatically select a given node from the plurality of nodes to function as a master node to program a programmable device on behalf of all nodes in the plurality of nodes to manage shared resource of a chassis on behalf of all the nodes in the plurality of nodes.

The instructions may further include instructions that, when executed by a processor, cause the processor to communicate with an enterprise local area network over a network, different from the dedicated network, to manage the respective baseboard management controllers.

In an embodiment, the shared resource includes at least one of a fan for the chassis, a power supply unit for the chassis, light emitting diodes (LEDs) on a front panel of the chassis, and a temperature sensor for the chassis.

The above description is intended by way of example only. Various modifications and structural changes may be made therein without departing from the scope of the concepts described herein and within the scope and range of equivalents of the claims.

What is claimed is:

1. A method comprising:
in a chassis comprising a plurality of nodes, a network switch, and a programmable device configured to manage a shared resource of the chassis, establishing, using the network switch, a dedicated network among respective baseboard management controllers of nodes in the plurality of nodes;
using the dedicated network, automatically selecting a first node from the plurality of nodes as a master node to program the programmable device on behalf of all nodes in the plurality of nodes to manage the shared resource of the chassis on behalf of all the nodes in the plurality of nodes; and
when the first node receives a communication from a second node from the plurality of nodes indicating that the second node is also, simultaneously, functioning as the master node, selecting the first node over the second as the master based on a physical slot position in the chassis of the first node,
wherein each of the respective baseboard management controllers of nodes is configured to periodically receive node data, via a broadcasted transmission, from each other node in the plurality of nodes via the dedicated network, such that respective baseboard management controllers of the nodes store, in memory, node data from each other node in the plurality nodes.

2. The method of claim 1, further comprising the respective baseboard management controllers communicating with an enterprise local area network over a network, different from the dedicated network, to manage the respective baseboard management controllers.

3. The method of claim 1, wherein the shared resource comprises at least one of a fan for the chassis, a power supply unit for the chassis, light emitting diodes (LEDs) on a front panel of the chassis, and a temperature sensor for the chassis.

4. The method of claim 1, further comprising providing a communication path, different from the dedicated network, between each node of the plurality of nodes and the programmable device that is used to program the programmable device.

5. The method of claim 4, wherein the communication path is one of an Inter-Integrated Circuit (I2C) bus or general purpose input output line.

6. The method of claim 1, further comprising causing the first node to function as the master node after listening for, but not receiving after a predetermined amount of time, a master data packet from any other nodes in the plurality of nodes.

7. The method of claim 6, wherein the predetermined amount of time is determined based on a physical slot on the chassis in which the first node is mounted.

8. The method of claim 1, further comprising causing the first node to no longer function as the master node when the first node receives a master data packet from another node in the plurality of nodes.

9. The method of claim 1, further comprising receiving from another node in the plurality of nodes a master grant request which causes the first node to no longer function as the master node.

10. An apparatus comprising:
a chassis;
a network switch;
a programmable device configured to manage a shared resource of the chassis; and
a plurality of nodes disposed in the chassis, wherein each node in the plurality of nodes comprises a baseboard management controller and a network interface to communicate with the network switch, wherein the plurality of nodes and the network switch define a dedicated network,
wherein respective baseboard management controllers of each of the nodes in the plurality of nodes are configured to automatically select a first node from the plurality of nodes as a master node to program the programmable device on behalf of all nodes in the plurality of nodes to manage the shared resource of the chassis on behalf of all the nodes in the plurality of nodes,
wherein when the first node receives a communication from a second node from the plurality of nodes indicating that the second node is also, simultaneously, functioning as the master node, selecting the first node over the second as the master node based on a physical slot position of the first node in the chassis, and
wherein each of the respective baseboard management controllers of nodes is configured to periodically receive node data, via a broadcasted transmission, from each other node in the plurality of nodes via the dedicated network, such that respective baseboard management controllers of the nodes store, in memory, node data from each other node in the plurality nodes.

11. The apparatus of claim 10, wherein each respective baseboard management controller comprises another network interface to an enterprise local area network, different from the dedicated network, to manage each respective baseboard management controller.

12. The apparatus of claim 10, wherein the shared resource comprises at least one of a fan for the chassis, a power supply unit for the chassis, light emitting diodes (LEDs) on a front panel of the chassis, and a temperature sensor for the chassis.

13. The apparatus of claim 10, further comprising a communication path, different from the dedicated network, between each node of the plurality of nodes and the programmable device that is used to program the programmable device.

14. The apparatus of claim 13, wherein the communication path is one of an Inter-Integrated Circuit (I2C) bus or a general purpose input output line.

15. The apparatus of claim 10, wherein the baseboard management controller of the first node in the plurality of nodes is configured to cause the first node to function as the master node after listening for, but not receiving for a predetermined amount of time, a master data packet from any other nodes in the plurality of nodes.

16. A non-transitory computer readable storage media encoded with instructions that, when executed by a processor, cause the processor to:
- establish, using a network switch, a dedicated network among respective baseboard management controllers of nodes in a plurality of nodes;
- using the dedicated network, automatically select a first node from the plurality of nodes as a master node to program a programmable device on behalf of all nodes in the plurality of nodes to manage shared resource of a chassis on behalf of all the nodes in the plurality of nodes; and
- when the first node receives a communication from a second node from the plurality of nodes indicating that the second node is also, simultaneously, functioning as the master node, select the first node over the second as the master node based on a physical slot position of the first node in the chassis,
- wherein each of the respective baseboard management controllers of nodes is configured to periodically receive node data, via a broadcasted transmission, from each other node in the plurality of nodes via the dedicated network, such that respective baseboard management controllers of the nodes store, in memory, node data from each other node in the plurality nodes.

17. The non-transitory computer readable storage media of claim 16, wherein the instructions, when executed by the processor, cause the processor to communicate with an enterprise local area network over a network, different from the dedicated network, to manage the respective baseboard management controllers.

18. The non-transitory computer readable storage media of claim 16, wherein the shared resource comprises at least one of a fan for the chassis, a power supply unit for the chassis, light emitting diodes (LEDs) on a front panel of the chassis, and a temperature sensor for the chassis.

* * * * *